Oct. 24, 1950  A. R. CUNNINGHAM  2,527,118
VEHICLE CONSTRUCTION
Filed Jan. 20, 1947  3 Sheets-Sheet 1
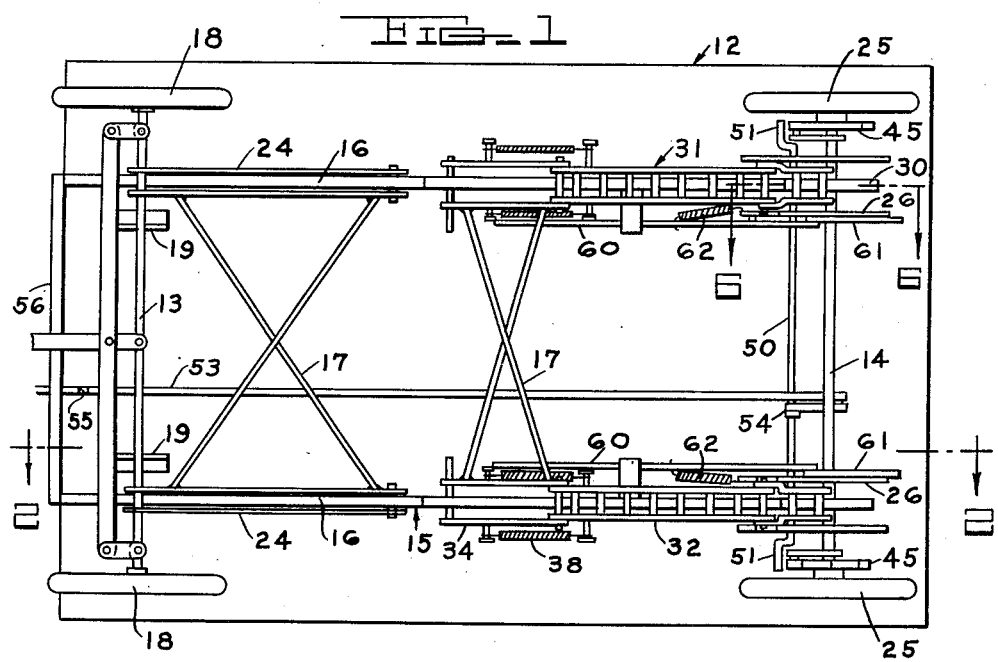
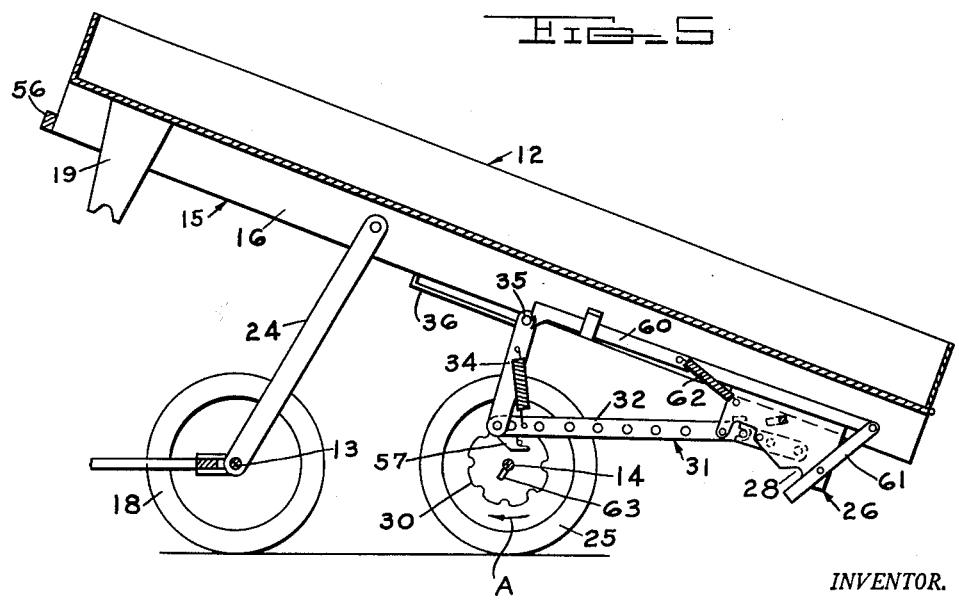
INVENTOR.
ARTHUR RAYMOND CUNNINGHAM
BY
ATTORNEYS Oct. 24, 1950     A. R. CUNNINGHAM     2,527,118
VEHICLE CONSTRUCTION
Filed Jan. 20, 1947     3 Sheets-Sheet 2
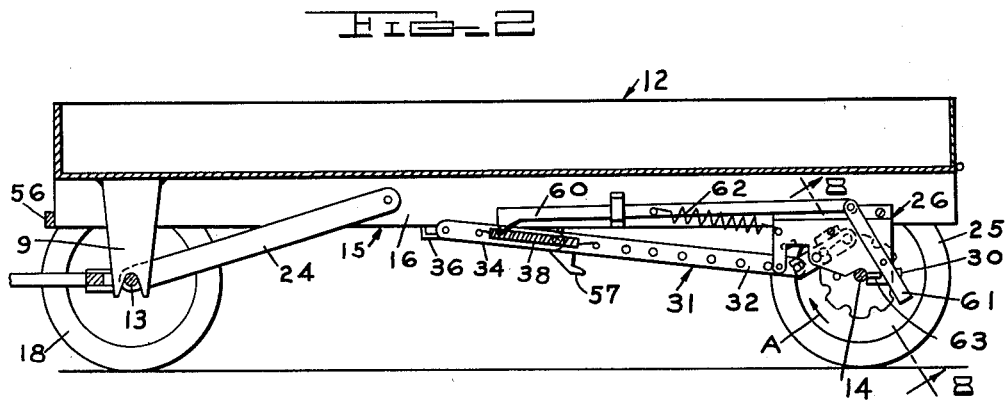
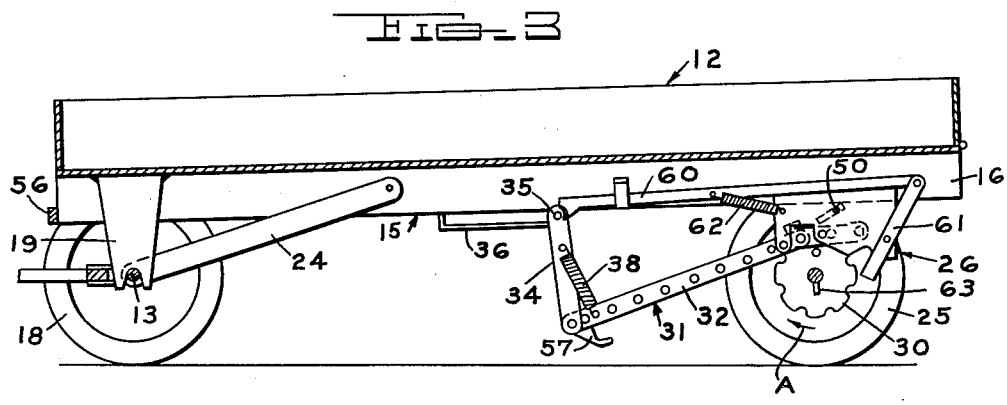
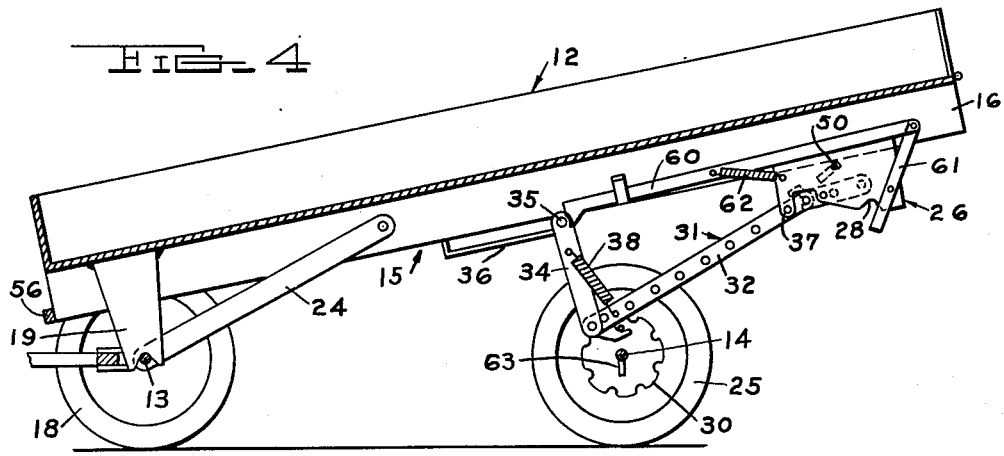
INVENTOR.
ARTHUR RAYMOND CUNNINGHAM
BY
ATTORNEYS Oct. 24, 1950     A. R. CUNNINGHAM     2,527,118
VEHICLE CONSTRUCTION
Filed Jan. 20, 1947     3 Sheets-Sheet 3
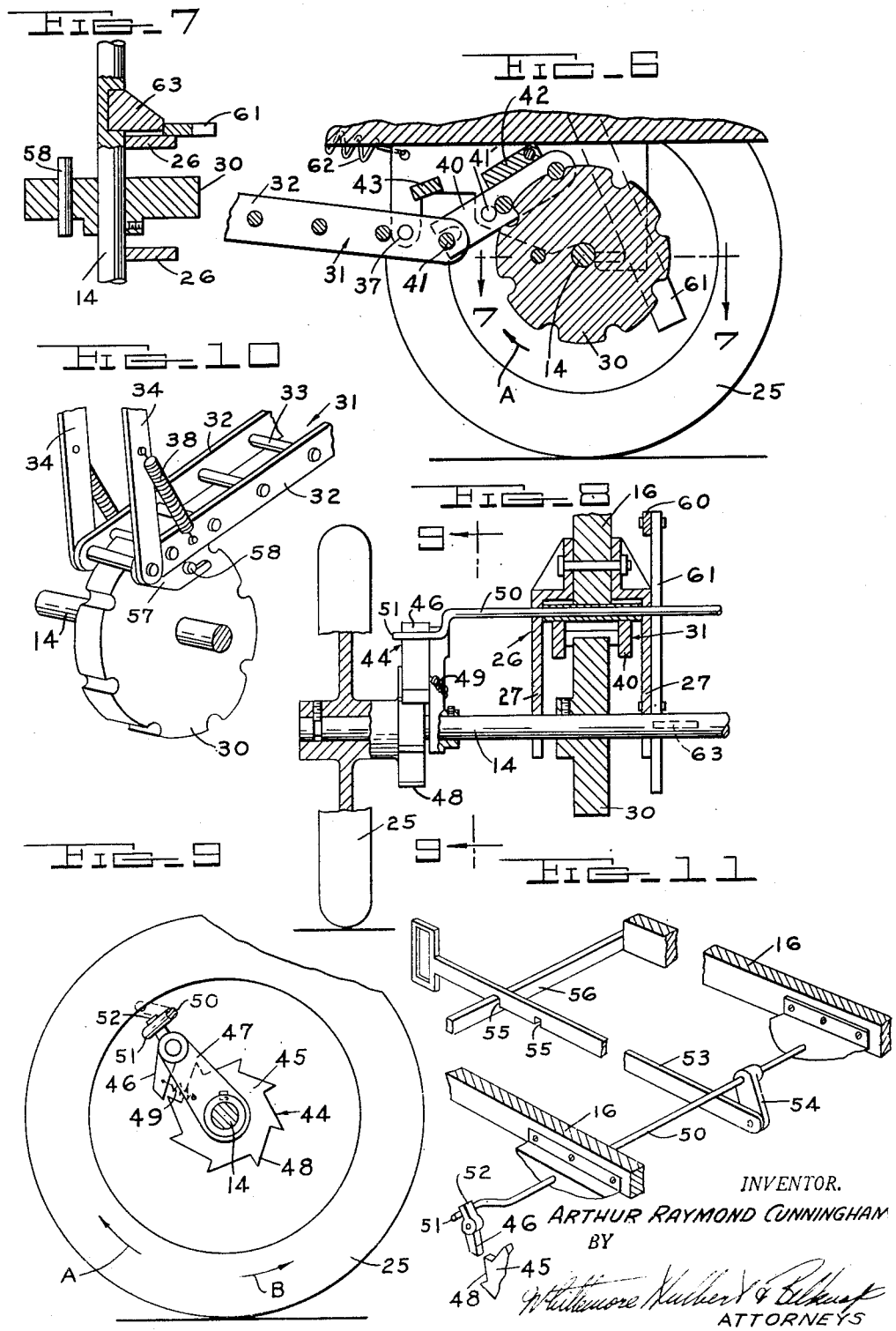

Patented Oct. 24, 1950

2,527,118

UNITED STATES PATENT OFFICE 2,527,118

VEHICLE CONSTRUCTION

Arthur Raymond Cunningham, Detroit, Mich.

Application January 20, 1947, Serial No. 723,081

14 Claims. (Cl. 298—20)

This invention relates generally to load carrying vehicles and refers more particularly to vehicles of this type having means for facilitating removal of the load therefrom.

An object of this invention is to provide a vehicle having a load carrying body and having improved means for tilting the body at an angle predetermined to enable dispensing the contents of the body by the action of gravity.

A more detailed object of this invention is to provide a vehicle having mechanism responsive to movement of the ground engaging wheels adjacent one end of the vehicle body toward the ground engaging wheels adjacent the opposite end of the vehicle body to raise the first named end of the body and responsive to movement of the second mentioned ground engaging wheels in a direction toward the first named ground engaging wheels to swing the adjacent end of the body upwardly about the latter ground engaging wheels to a position inclined at such an angle that the load is dispensed by the action of gravity from first named end of the body.

Another feature of this invention is to rotatably support the ground engaging wheels at one end of the body on an axle supported for rotation and having selectively operable means for connecting the same to the wheels for rotation by the latter.

Still another feature of this invention is to provide unloading mechanism having a rack carried by the body beneath the latter and extending in the direction of length of the body in mesh with a toothed element fixed to the axle for rotation thereby, and having means responsive to rotation of the toothed element in one direction to locate the rack in an inclined plane so that the adjacent end of the body is raised as rotation of the toothed element in the above direction is continued.

A further object of this invention is to provide unloading mechanism having means for restoring the rack to its inoperative position in response to rotation of the toothed element in a direction opposite the direction referred to in the preceeding paragraph and also having means for disconnecting the axle from the wheel as the toothed element reaches its normal position.

The foregoing as well as other objects will be made more apparent as this description proceeds, especially when considered in connection with the accompanying drawings, wherein:

Figure 1 is a bottom elevational view of a vehicle equipped with unloading mechanism embodying the features of this invention;

Figure 2 is a sectional view taken on the plane indicated by the line 2—2 of Figure 1;

Figures 3, 4 and 5 are respectively sectional views similar to Figure 2 showing the various parts of the unloading mechanism in different positions;

Figure 6 is a sectional view taken on the line 6—6 of Figure 1;

Figure 7 is a sectional view taken on the line 7—7 of Figure 6;

Figure 8 is a sectional view taken on the line 8—8 of Figure 2;

Figure 9 is a sectional view taken on the line 9—9 of Figure 8;

Figure 10 is a perspective view of a part of the unloading mechanism; and

Figure 11 is a perspective view partly in section of a part of the unloading mechanism.

The unloading mechanism forming the subject matter of this invention may be used in connection with numerous different types of vehicles where it is desired to effect unloading of the body by tilting the latter. However, for the purpose of illustrating the invention, the unloading mechanism is disclosed in connection with a typical farm type wagon having a load carrying body 12 suitably carried on front and rear axles 13 and 14 respectively. The body 12 is mounted on a frame 15 comprising laterally spaced side sills 16 extending in the direction of length of the body beneath the latter and secured together by cross braces 17.

A pair of ground engaging wheels 18 are suitably pivotally supported at opposite ends of the front axle 13 for turning movement about substantially vertical axes to enable steering of the vehicle either to the right or left. The particular steering mechanism forms no part of the present invention and may be any one of a number of conventional designs.

The front end portion of the vehicle body 12 is releasably supported on the front axle 13 by a pair of brackets 19 secured to the underside of the body 12 at points spaced from each other in the direction of length of the axle 13 and projecting downwardly from the body. The lower ends of the brackets 19 are bifurcated, and are positioned so that furcations extend at opposite sides of the axle 13. Thus the brackets 19 provide a driving connection between the body 12 and axle 13, and at the same time, are releasable from the axle by merely raising the front end portion of the body.

Upon reference to Figures 1 to 5 inclusive, it will be noted that the opposite end portions of the front axle 13 are connected to the frame 15 by links 24. The links are arranged in pairs, and the links of each pair respectively extend along opposite sides of the sill members 16. The front ends of the links are pivoted to the axle 13, and the rear ends of the links are pivoted to the respective sill members 16 at points spaced rearwardly from the axle 13. In the present instance the links not only serve as an additional driving connection between the axle 13 and the body 12, but also act to swing the front end of the body upwardly in a manner to be more fully hereinafter described.

The rear axle 14 supports a pair of ground engaging wheels 25, and also supports the rear end of the body 12. As shown particularly in Figure 8 of the drawings, the ground engaging wheels 25 are journalled on the axle 14 for rotation relative thereto. For supporting the rear end of the body on the axle 14, a pair of brackets 26 is provided. Each bracket 26 comprises a pair of plates 27 spaced laterally from each other and secured to opposite sides of the adjacent sill member 16. The lower ends of the plates project downwardly from the sill members and are formed with recesses 28 for receiving the axle 14. It will be noted from Figures 2 to 5 inclusive of the drawings that the recesses 28 are shaped to enable releasing the axle 14 upon forward displacement of this axle relative to the body. Thus it will be noted that the body is supported on both axles in a manner to enable the same to be disengaged from the axles by merely a lifting movement.

A pair of tooth members in the form of sprockets 30 are secured to the rear axle 14 in spaced relationship lengthwise of the axle, and are formed with teeth on the peripheral face thereof for engagement with suitable racks 31. Referring again to Figure 8 of the drawings, it will be noted that the toothed members 30 are respectively secured to the axle 14 between the plates 27 of the brackets 26, and the racks 31 also respectively extend between the plates 27. Each rack 31 comprises a pair of links 32 secured together at longitudinally spaced points by pins 33 which cooperate with one another to form, in effect, a chain for engagement with the teeth on the adjacent member 30. The front end portions of the racks 31 are respectively pivotally connected to the sill members 16 for sliding movement in the direction of length of the latter. As shown in Figure 10 of the drawings, a pair of links 34 are respectively pivotally connected at their lower ends to the front end portions of the links 32, and are connected at the upper ends by a pin 35. The pins 35 are respectively slidably supported between the links 34 in retainers 36 secured to the bottom edges of the sill bars 16 intermediate the ends of the latter. The rear ends of the racks 31 are respectively pivotally connected to the brackets 26 between the plates 27 by pivot pins 37 in a manner to enable the front end portions of the racks to be swung to the two positions shown in Figures 2 and 3 of the drawings. When the racks are in the position thereof shown in Figure 3 of the drawings, the front end portions thereof are spaced downwardly a substantial distance from the rear ends of the racks so that the latter assume an inclined plane. The racks are yieldably urged in the above inclined position by springs 38 having the rear ends respectively anchored on the racks 31 and having the opposite ends respectively anchored on the links 34 intermediate the ends of the latter.

Thus in the position of the parts shown in Figure 3 of the drawings, the springs 38 maintain the links 34 in a substantially vertical position, so that an upward force applied to the rack is transmitted directly to the frame 15 through the pins 35. On the other hand, when the racks are in their inoperative positions shown in Figure 2, the links 34 are substantially aligned with the links 32, and the springs 38 have practically no effect on the linkage.

Referring again to Figure 6 of the drawings, it will be noted that the rear ends of the racks project rearwardly beyond the pivot pins 37 and are hingedly connected to rack sections 40. The front ends of the rack sections 40 are respectively pivoted to the rear ends of the racks 31 by pins 41, and the rear end portions of the rack sections are also respectively engaged by the teeth on the members 30. It will further be noted that the rack sections 40 are pivoted intermediate the above mentioned ends on the respective brackets 26 by pins 41'. The above arrangement is such that the rack sections are inclined upwardly from the rear ends of the racks 31, and are responsive to rotation of the members 30 in the direction of the arrow A to swing the racks 31 about the pivots 37 from the position of the racks shown in Figure 2 of the drawings to the operative position thereof shown in Figure 3 of the drawings. The manner in which this function is effected will be set forth more in detail in the following description.

The rack sections 40 are located by stops 42 respectively secured to the brackets 26 between the plates 27 in positions to abut the top surfaces of the sections 40 adjacent the rear ends of the latter. The arrangement is such that as the rear axle 14 is moved forwardly relative to the body 12 from the normal position shown in Figure 2 of the drawings, the toothed members 30 are rotated in the direction of the arrow A and eventually mesh with the pins 41. The resulting upward thrust applied to the pins 41 urges the adjacent ends of the racks 31 and rack sections 40 upwardly against stops 43 also respectively secured to the brackets 26 between the plates 27. Movement of the rear ends of the racks 31 in an upward direction swings the front end portions of the racks 31 downwardly about the pins 37 to the position shown in Figure 3 of the drawing. In accomplishing this latter function the links 34 are swung by the springs 38 to the vertical positions shown in Figure 3 of the drawings, and the racks 31 are rigidly supported at the angle of inclination also shown in this figure of the drawings.

It has been stated above that the rear ground engaging wheels 25 are journalled on the axle 14 for rotation relative thereto. This being the case it follows that the axle 14 must be connected to the wheels 25 before the toothed members 30 may be rotated relative to the racks 31 to advance or displace the axle 14 forwardly relative to the body 12. In the present instance, the wheels 25 are respectively connected to the axle for rotating the latter by a pair of latches 44. Each latch comprises a ratchet wheel 45 and a pawl 46 having one end pivoted to the upper end of an arm 47. The ratchet wheels 45 are respectively secured to the wheels 25 and the lower ends of the arms 47 are secured to the axle 14. The free end portions of the pawls 46 are respectively urged into engagement with the ratchet teeth 48 on the wheels 45 by springs 49. The ratchet teeth 48 are shaped or arranged to cooperate with the pawls 46 to drive the shaft 14 when the ground engaging wheels 25 are rotated in the direction of the arrow A and to permit free rotation of the wheels 25 relative to the axle 14 when the wheels 25 are rotated in the direction of the arrow B. In the present illustration the arrow B indicates the direction of rotation the wheels 25 assume when the vehicle is moving in a forward direction and the arrow A designates the direction of rotation of the wheels 25 when the vehicle is moved rearwardly.

However, in order to permit rearward movement of the vehicle without effecting rotation of the axle 14 and associated toothed members 30, provision is made herein for normally holding the pawls 46 in their released positions shown in Figure 9 of the drawings. For accomplishing the above result, a transversely extending rod 50 is journalled on the brackets 26 for rotation and the free ends of the rod are formed with cranks or eccentrics 51. These cranks provide stops for respectively engaging lugs 52 projecting upwardly from the pawls 46 and are urged into engagement with the cranks or stops 51 by the springs 49. As shown in Figure 11 of the drawings, the stops 51 are positioned in advance of the lugs 52 on the pawls 46 and serve to hold the free ends of the pawls out of the path of travel of the ratchet teeth 48. The rod is held in the above position by a bar 53 extending longitudinally of the vehicle and having the front end positioned for convenient manipulation by the operator. The rear end of the bar is pivoted to the lower end of a link 54 having the upper end secured to the rod. A pair of notches 55 are formed in the bottom edge of the bar 53 in spaced relation to each other and adapted to be selectively engaged with a cross bar 56 extending between the sills 16 of the frame 15. The notches 55 are so located with respect to the angular relationship of the stops 51 that when the forwardmost notch 55 is engaged with the cross bar 56, the stops 51 engage the lugs 52 on the pawls and hold the free ends of the latter out of engagement with the ratchet wheels 45. On the other hand when the rearwardmost notch 55 is engaged with the cross bar 56, the stops are positioned out of registration with the lugs 52 and the free ends of the pawls 46 are urged into operative relationship with the ratchet teeth 48 by the springs 49.

*Operation*

When the vehicle is being operated normally, the various parts of the unloading mechanism are in the relative positions shown in Figure 2 of the drawings. In general the racks 31 are in their elevated positions and the latch operating bar 53 is in a position wherein the forwardmost notch 55 is engaged with the cross bar 56. In other words, the latches 44 are held by the rod 50 in their released positions, so that the vehicle may be moved forwardly or rearwardly without interference from the unloading mechanism.

Assuming now that it is desired to tilt the vehicle body 12 to its unloading position shown in Figure 5 of the drawings, the bar 53 is raised to disengage the forwardmost notch 55 from the cross bar 56 and the bar 53 is pulled in a forward direction to engage the rearwardmost notch 55 with the cross bar 56. This movement of the bar 53 rocks the rod 50 in a direction to disengage the stops 51 from the lugs 52 on the pawls 46 and permits the springs 49 to swing the free ends of the pawls into engagement with the ratchet teeth 48 on the wheels 45. As stated above the ratchet wheels 45 are respectively secured to the ground engaging wheels 25 and the pawls 46 are connected to the rear axle 14. Thus due to the nature of the ratchet teeth 48, the axle 14 is rotated as a unit with the ground engaging wheels 25 when the latter are rotated in the direction of the arrow A or in a rearward direction.

Rearward rotation is imparted to the ground engaging wheels by moving the vehicle rearwardly, and since the toothed members 30 are fixed to the axle 14, it follows that these members are rotated with the axle 14. Initial rotation of the toothed members in the direction of the arrow A is effected relative to the rack sections 40 and imparts a forward displacement of the axle 14 relative to the vehicle body 12. When the toothed members 30 engage the front end portions of the rack sections beyond the pivot pins 41, the latter ends of the rack sections are swung upwardly against the stops 43 and effect a corresponding movement of the rear ends of the racks 31 about the pivot pins 37. As a result, the front ends of the racks 31 are swung downwardly and the upper ends of the links 34 are moved to the rear ends of the retainers 36 by the springs 38. The above position of the parts is shown in Figure 3 of the drawings, and it will be noted that the links 34 extend substantially vertically to rigidly support the racks 31 at the angle of inclination shown in this figure of the drawings.

Continued rotation of the toothed members 30 in the direction of the arrow A advances the toothed members along the racks 31 and, due to the angle of inclination of the latter, the vehicle body is raised to the position shown in Figure 4 of the drawings. The extent of advancement of the members 30 along the racks 31 is limited by stops 57 in the form of fingers respectively secured to the front ends of the racks 31 in positions to engage pins 58 projecting laterally outwardly from the toothed members 30. Continued rearward movement of the vehicle after the pins 58 on the members 30 engage the stops 57 imparts a rearward thrust on the front axle 13 and causes the links 24 to swing the front end of the vehicle body 12 upwardly about the rear axle 14 to the position shown in Figure 5 of the drawings. When the body 12 is tilted to the position shown in Figure 5 of the drawings, the angle of inclination is such as to permit the load supported in the body to move out of the rear end of the body by the action of gravity.

After the unloading operation the body 12 may be restored to the position shown in Figure 2 of the drawings by moving the front axle 13 forwardly. This movement of the axle 13 permits the links 24 to swing the front end of the body downwardly to again seat the brackets 19 on the axle 13. Continued forward movement of the vehicle causes the members 30 to roll rearwardly along the racks 31 to lower the rear end of the body 12. As the toothed members 30 continue to roll rearwardly along the rack sections 40, the latter are returned into engagement with the stops 42 and the adjacent pivotally connected ends of the rack sections 40 and racks 31 are moved downwardly away from the stops 43. Also the brackets 26 are again seated on the axle 14.

During the final return movement of the members 30 along the rack sections 40, provision is made for positively moving the upper ends of the links 34 to their forwardmost positions in the retainers 35 in order to return the racks 31 to their elevated or inoperative positions shown in Figure 2 of the drawings. As shown in Figures 2 to 5 inclusive of the drawings, a pair of links 60 are supported for fore and aft sliding movement at opposite sides of the frame 15 with the front ends positioned to respectively engage the rear sides of the pins 35 connecting the upper ends of the pairs of links 34. The rear ends of the links are respectively pivoted to the upper ends of the links 61 and the latter are pivoted intermediate their ends to the brackets 26 rearwardly of the axle 14. The links 60 are normally urged to positions wherein the front ends are respectively positioned adjacent the rear ends of the retainers 36 for engagement with the pins 35 when the latter are located at the rear ends of the retainers. The links 60 are moved forwardly against the action of the springs 62 to advance the pins 35 to the front ends of the retainers 36 by cams 63 secured to the shaft 14 in positions to respectively engage the lower end portions of the links 61 as the axle 14 is returned to its normal position by the toothed members 30.

In the present instance the latches 44 may be automatically released as the axle 14 is returned to its normal position by the toothed members 30. In order to accomplish this result the bar 53 is manipulated immediately following the unloading operation to re-engage the forwardmost notch 55 with the cross bar 56 so as to locate the stops 51 in the path of the lugs 52 on the pawls 46. Thus during the final return movement of the axle 14 to its normal position by the members 30, the lugs 52 engage the stops 51 and disengage the pawls from the ratchet wheels 45.

What I claim as my invention is:

1. A vehicle comprising an axle supported for rotation and having ground engaging wheels rotatably supported thereon, a body supported by the axle for upward swinging movement, releasable latch means for connecting the axle to at least one of the wheels to effect rotation of the axle as a unit with the wheel, means between the body and axle for raising the body relative to the axle in response to rotation of said axle, and means for normally holding the latch means in the released position.

2. A vehicle comprising an axle supported for rotation and having ground engaging wheels rotatably supported thereon, a body supported by the axle for upward swinging movement, latch means for connecting the axle to at least one of the wheels to effect rotation of the axle as a unit with the wheel, means between the body and axle operated by the latter to raise said body, releasable means for normally holding the latch means in its released position, and means for engaging the latch means in response to releasing said holding means.

3. A vehicle comprising an axle supported for rotation and having ground engaging wheels rotatably supported thereon, a body supported by the axle for upward swinging movement, latch means for connecting the axle to at least one of the wheels to effect rotation of the axle as a unit with the wheel in one direction of rotation, said latch means including a ratchet wheel rotatable as a unit with the ground engaging wheel and a pawl supported on the axle and engageable with the teeth on the ratchet wheel, and means between the body and axle operated by the latter to raise said body.

4. A vehicle comprising an axle supported for rotation and having ground engaging wheels rotatably supported thereon, a body supported by the axle for upward swinging movement relative to the axle, latch means for connecting the axle to at least one of the wheels to effect rotation of the axle as a unit with the wheel in one direction of rotation, said latch means including a ratchet wheel rotatable as a unit with the ground engaging wheel and a pawl supported on the axle and engageable with the teeth on the ratchet wheel, means between the body and axle operated by the latter to raise the body relative to the axle and selectively operable means for moving the pawl into and out of engagement with the ratchet wheel.

5. A vehicle comprising an axle supported for rotation and having ground engaging wheels rotatably supported thereon, a body supported by the axle for upward swinging movement relative to the axle, latch means for connecting the axle to at least one of the wheels to effect rotation of the axle as a unit with the wheel in one direction of rotation, said latch means including a ratchet wheel rotatable as a unit with the ground engaging wheel and a pawl supported on the axle and engageable with teeth on the ratchet wheel, releasable means for normally holding the pawl out of engagement with the ratchet wheel, spring means for moving the pawl into engagement with the ratchet wheel in response to releasing said holding means, and means between the axle and body operated by the axle to raise the body.

6. A vehicle comprising an axle supported for rotation and having ground engaging wheels rotatably supported thereon, a body supported by the axle for upward swinging movement, latch means for connecting the axle to at least one of the wheels to effect rotation of the axle as a unit with the wheel in one direction of rotation, said latch means including a ratchet wheel rotatable as a unit with the ground engaging wheel, a pawl engageable with the ratchet wheel and fixed on the axle for rotation about the axis of the latter, means for holding the pawl out of engagement with the ratchet wheel including a stop located in the path of rotation of the pawl, means for selectively moving the stop into and out of the path of travel of the pawl, and means between the body and axle operated by the latter for raising the body relative to the axle.

7. A vehicle comprising frame structure, an axle having ground engaging wheels thereon, a rack extending fore and aft of the vehicle and supported on the frame structure for movement from a position substantially parallel to the structure to a position in a plane inclined at a substantial angle to the frame structure, a rotatable toothed member carried by the axle in a position to engage the rack, and a connection between the rack and toothed member for moving the rack from the first position in response to rotation of the toothed member in one direction to the second position.

8. A vehicle comprising frame structure, an axle having ground engaging wheels thereon, a rack extending fore and aft of the vehicle and supported on the frame structure for movement from a position substantially parallel to the structure to a position in a plane inclined at a substantial angle to the frame structure, a toothed member rotatable in opposite directions and carried by the axle, and a connection between the rack and toothed member for alternatively moving the rack to the two aforesaid positions thereof upon rotation of the toothed member in opposite directions.

9. A vehicle comprising a body, an axle supported for rotation and having ground engaging wheels rotatably supported thereon, releasable latch means for connecting the axle to at least one of the wheels to effect rotation of the axle as a unit with the wheel, a rack carried by the body and extending longitudinally of the body beneath the latter, and a toothed member fixed to the axle and engageable with the rack.

10. A vehicle comprising a body, an axle supported for rotation and having ground engaging wheels rotatably supported thereon, releasable latch means for connecting the axle to at least one of the wheels to effect rotation of the axle as a unit with the wheel, a rack carried by the body and extending longitudinally of the body beneath the latter, means supporting the rack for movement from a position substantially parallel to the body to a position in a plane inclined at a substantial angle relative to the body, a toothed member fixed to the axle and engageable with the rack, and means responsive to initial rotation of the toothed member in one direction to move the rack from the first position to the second position thereof.

11. A vehicle comprising a body, an axle supported for rotation and having ground engaging wheels rotatably supported thereon, releasable latch means for connecting the axle to at least one of the wheels to effect rotation of the axle as a unit with the wheel, a rack carried by the body and extending longitudinally of the body beneath the latter, means supporting the rack for movement from a position substantially parallel to the body to a position in a plane inclined at a substantial angle relative to the body, a toothed member fixed to the axle and engageable with the rack, and means responsive to rotation of the toothed member in opposite directions to alternatively move the rack to the two positions aforesaid thereof.

12. A vehicle comprising a body, an axle supported for rotation and having ground engaging wheels rotatably supported thereon, releasable latch means for connecting the axle to at least one of the wheels to effect rotation of the axle as a unit with the wheel, a rack extending fore and aft of the body beneath the latter and carried by said body, means pivotally supporting one end of the rack for swinging movement in a substantially vertical plane, means supporting the opposite end of the rack for swinging movement from a first position substantially parallel to the body to a second position inclined at an angle to the body, a connection between the axle and body releasable upon raising the body, a toothed member secured to the axle for rotation therewith and positioned to engage the rack, means responsive to rotation of the toothed member in one direction to raise the body off the axle and swing the rack to its inclined position, and means responsive to rotation of the toothed member in the opposite direction to lower the body onto the axle and to return the rack to its first position.

13. A vehicle comprising a frame structure, an axle having ground engaging wheels thereon, a rotatable toothed member carried by the axle, a rack extending fore and aft of the vehicle beneath the frame structure in a position to be engaged by the toothed member, a pivotal connection between the end of the rack adjacent the toothed member and frame structure, means connecting the opposite end of the rack to the frame structure including an elongated link having one end pivotally connected to the second mentioned end of the rack and having the other end pivotally supported on the frame structure, a rack section having one end pivoted to the first mentioned end of the rack and having the other end engageable with said toothed member, and means for pivotally connecting the rack section intermediate the ends to the frame structure whereby rotation of the toothed member in one direction swings the second mentioned end of the rack downwardly.

14. A vehicle comprising an axle having ground engaging wheels, a body supported on the axle for tilting movement, a rack extending fore and aft of the vehicle beneath the body and having one end supported on the vehicle for pivotal movement in a substantially vertical plane, means connecting the opposite end of the rack to the vehicle including a link having one end pivotally supported on the vehicle and having the other end pivotally connected to the second mentioned end of the rack, means for swinging the rack about the first mentioned end to locate the rack in an inclined position with respect to the vehicle body, said last named means including a toothed member supported on the vehicle for rotation in a position to engage the rack at the first named end thereof, a rack section having one end pivoted to the first mentioned end of the rack and having the other end engageable with the toothed member, and a pin pivotally supporting the rack section intermediate the ends of the vehicle whereby rotation of the toothed member in one direction swings the rack in a downward direction about the first named end thereof.

ARTHUR RAYMOND CUNNINGHAM.

REFERENCES CITED

The following references are of record in the file of this patent:

UNITED STATES PATENTS

| Number | Name | Date |
|---|---|---|
| 1,400,752 | Land | Dec. 20, 1921 |
| 1,926,955 | Morgan | Sept. 12, 1933 |

FOREIGN PATENTS

| Number | Country | Date |
|---|---|---|
| 340,375 | France | July 5, 1904 |
| 386,185 | France | Apr. 7, 1908 |
| 120,402 | Switzerland | May 16, 1927 |